United States Patent
Wilkinson (12)

(10) Patent No.: US 6,263,652 B1
(45) Date of Patent: Jul. 24, 2001

(54) CONTINUOUSLY ADVANCING FRUIT HARVESTING MACHINE

(76) Inventor: Stephen Harold Wilkinson, 29 Lakeside Cir., Pahokee, FL (US) 33476

( * ) Notice: Subject to any disclaimer, the term of this patent is extended or adjusted under 35 U.S.C. 154(b) by 0 days.

(21) Appl. No.: 09/473,439

(22) Filed: Dec. 28, 1999

Related U.S. Application Data

(63) Continuation-in-part of application No. 08/931,108, filed on Sep. 15, 1997, now Pat. No. 6,006,507, which is a continuation-in-part of application No. 08/545,480, filed on Oct. 19, 1995, now Pat. No. 5,666,795.

(51) Int. Cl.[7] .................................................. A01D 46/24
(52) U.S. Cl. ............................................... 56/328.1
(58) Field of Search .................................. 56/328.1, 330, 56/339

(56) References Cited

U.S. PATENT DOCUMENTS 3,153,311 * 10/1964 Pool .
3,347,587 * 10/1967 Frost .
4,163,356 * 8/1979 Robbins et al. .
5,421,146 * 6/1995 Visser .

* cited by examiner

Primary Examiner—H. Shackelford

(57) ABSTRACT

A harvesting of fruit from trees utilizing a harvesting machine which continuously advances along the row is explained. The harvesting machine utilizes a canopy penetration, fruit engagement and pressure severing method of mechanical harvesting. A plurality of arm members are held by an arm housing in either a single vertically disposed row or in a plurality of vertically disposed rows. During a harvesting procedure the arm housing undergoes a series of motions including rearward and forward on the harvesting machine as well as outward and inward therefrom. These motions may be controlled in an endless number of combinations to produce a desired harvesting action. One such harvesting action involves isolating to eliminate influence of the forward motion of the harvesting machine from the arm members during an extension motion and a retraction motion into and out of the canopy of the tree so that the arm members may enter the canopy with minimal resistance. Another such harvesting action involves producing a gathering motion by the arm members while in the canopy of the tree. Multiple picking sets may act collectively to efficiently harvest the crop by providing for each picking set to have a primary target area of the canopy of the tree. This arrangement provides for repetitive harvesting of those portions of the tree where the majority of the crop resides.

18 Claims, 11 Drawing Sheets

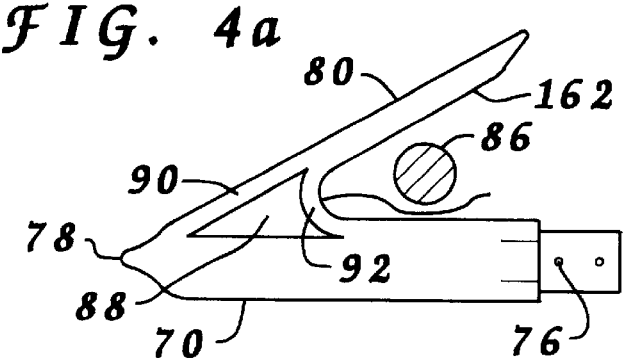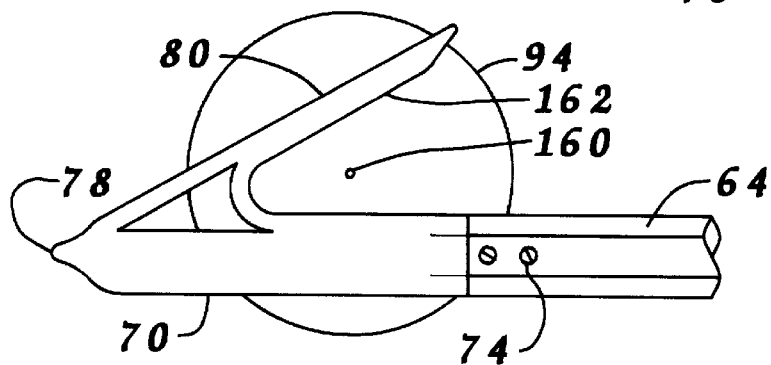

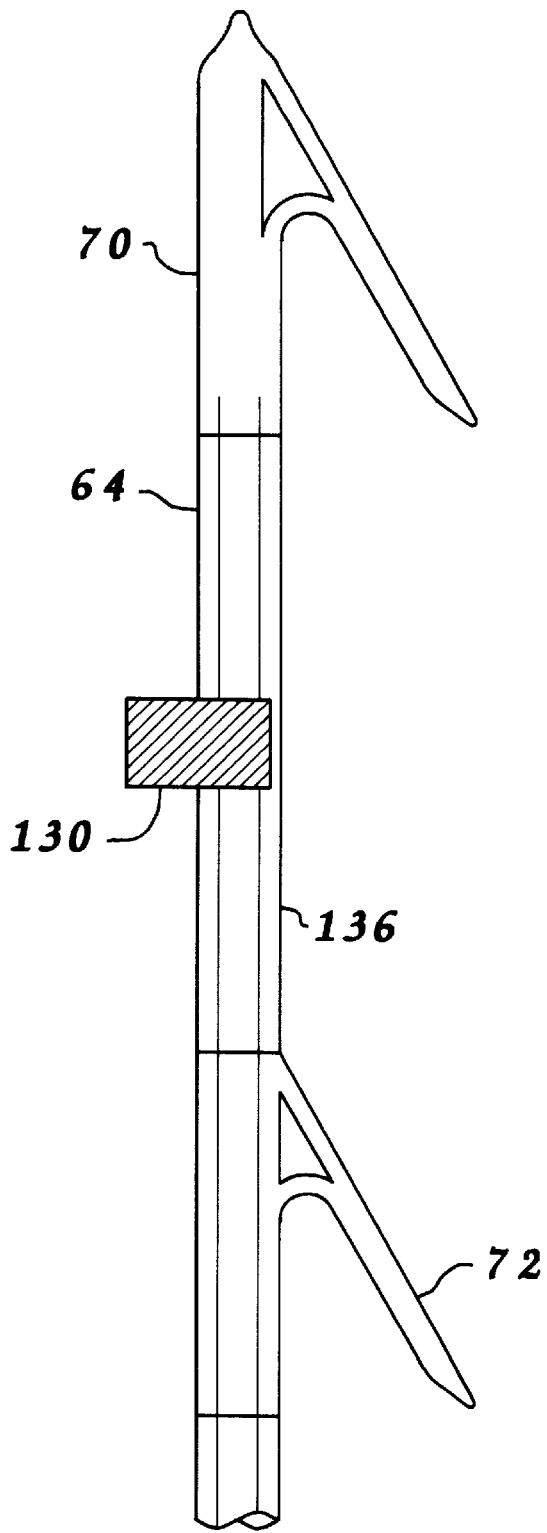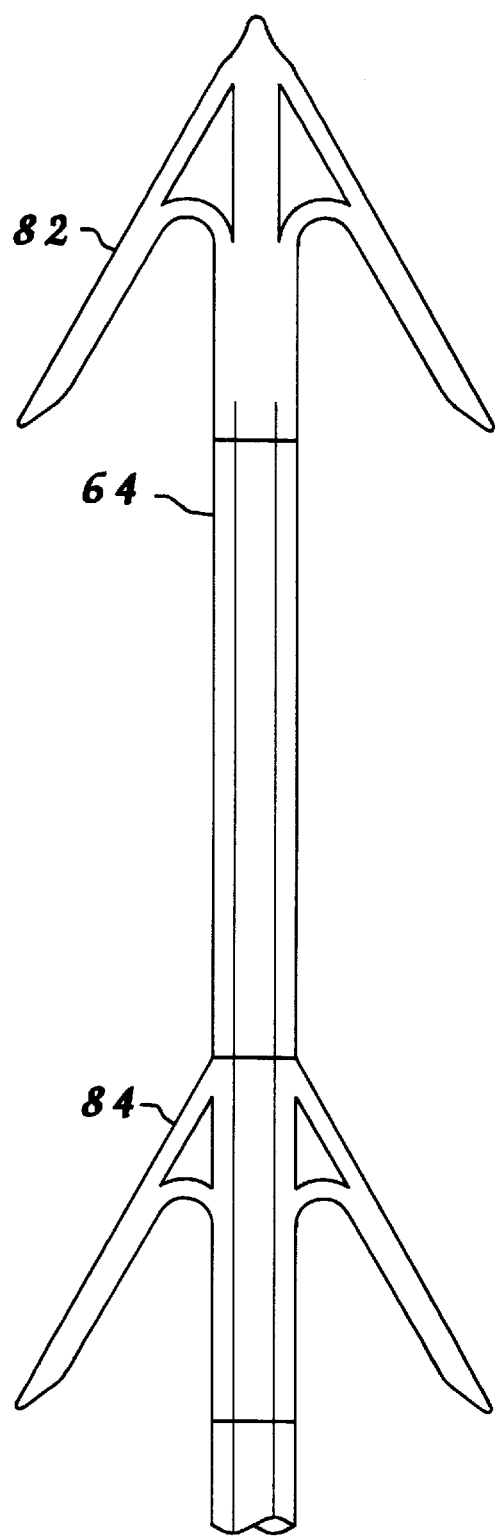

FIG. 8
FIG. 9
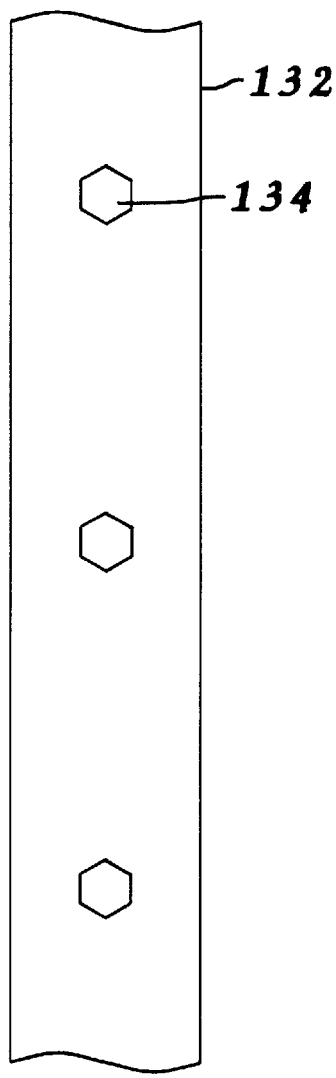
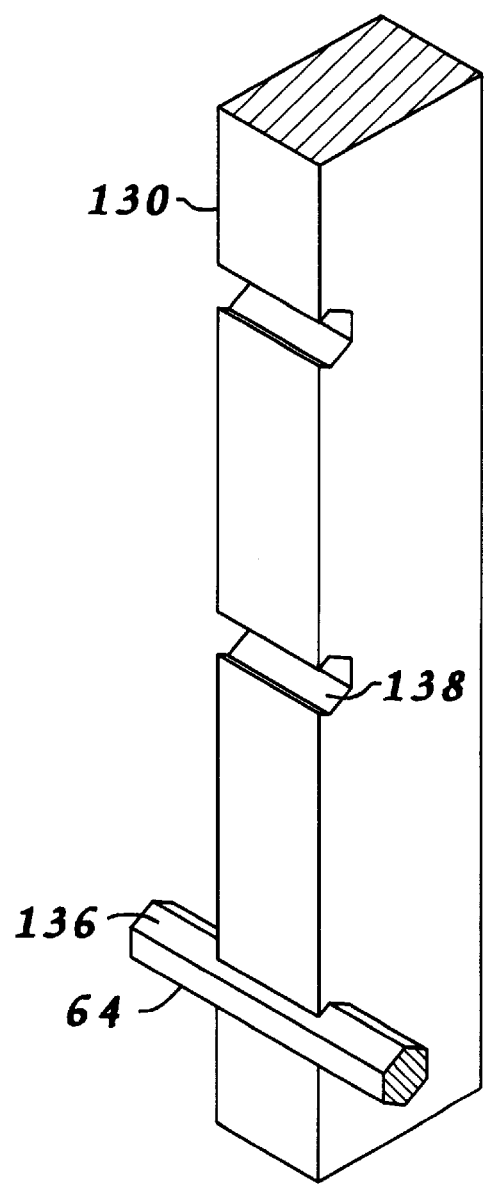

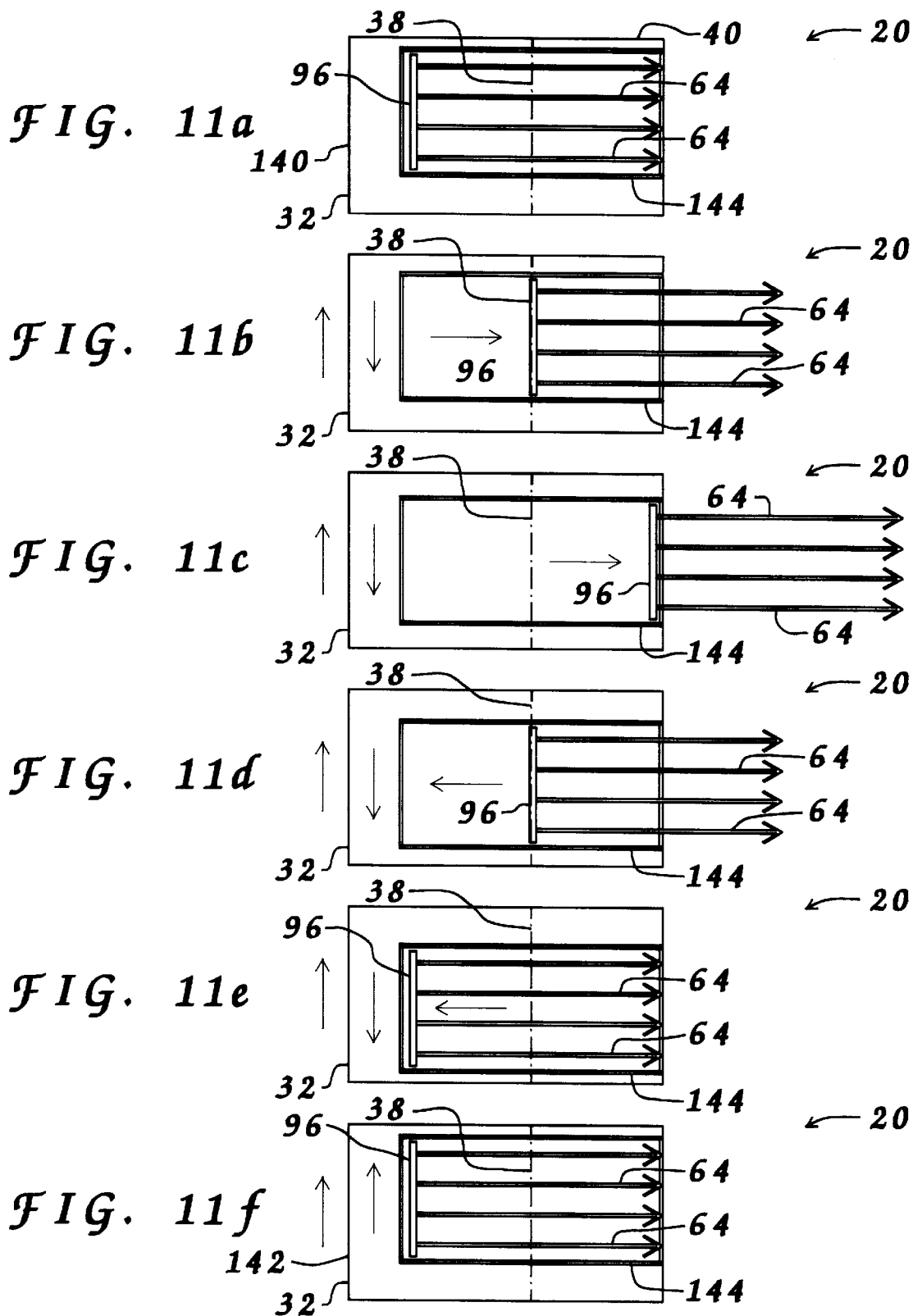

CONTINUOUSLY ADVANCING FRUIT HARVESTING MACHINE

CROSS-REFERENCES

This application is a continuation-in-part of Ser. No.: 08/931,108, filed Sep. 15, 1997, entitled "Dual Pressure Release Assembly for a Fruit Harvesting Machine", U.S. Pat. No. 6,006,507 issued Dec. 12, 1999 which is a continuation-in-part of U.S. Pat. No.: 5,666,795, issued Sep. 16, 1997, Ser. No.: 08/545,480, filed Oct. 19, 1995, entitled "Citrus Harvesting Machine". These applications are incorporated herein by this reference.

BACKGROUND

1. Field of the Invention

Generally, the invention relates to fruit harvesting machines. More specifically, the invention relates to such machines which operate utilizing a canopy penetration, fruit grasp and pressure induced sever method of harvesting.

2. Description of the Prior Art

Mechanical harvesting of fruit from trees has been attempted using various designs of machines. One class of machines provide for picking members to be inserted and withdrawn from a canopy of the tree. A sub-class of these machines employ picking arms which are displaced generally along there longitudinal length during an extension cycle and a withdrawal cycle into and out of the canopy of the tree.

Typically these penetration type harvesting machines come to a complete stop prior to beginning the harvesting operation. Then, once stopped, the picking arms are inserted into the canopy of the tree to there desired depth of penetration and withdrawn from the canopy of the tree. Certain designs of such machines require a subsequent insertion and withdrawal cycle to ensure adequate harvesting of the crop by the picking assembly. Following any insertion and withdraw operation the harvesting machine is advanced along the row of trees and brought to a complete stop again at the new harvesting position. Then the procedure is repeated with a complete pause of the harvesting machine prior to each and every cycle of insertion and withdrawal from the canopy of the tree. This arrangement is extremely time consuming and requires extreme diligence on the part of the operator to maximize production. If the operator advances an insufficient distance between pauses an excessive overlap exists and production suffers as additional cycles of advance, pause and picking arm displacement are required during movement down a row of trees. If the operator advances beyond the required distance than a section of the tree is missed by the harvesting operation and the percentage of fruit left on the trees increases to an unacceptable level. Both of these results may be disastrous to the owner of the grove being harvested.

Various attempts have been made to provide for a mechanical harvesting of fruit from a grove of trees. These attempts have been less efficient than desired. As such, it may be appreciated that there continues to be a need for a harvesting machine which can continuously advance along the row of trees while complete coverage is provided by the harvesting procedure in order to minimize the time required for the harvesting while maximizing the amount of fruit harvested. The present invention substantially fulfills these needs.

SUMMARY

In view of the foregoing disadvantages inherent in the known types of harvesting machines, your applicant has devised a machine having a machine frame, a plurality of arm members, means to continuous move during a harvesting procedure, means to repetitively perform a series of movements during the harvesting procedure while the machine continuously advances and picking members attached to each of the arm members. The machine frame has a front portion and a center axis. The plurality of arm members are positioned on the harvesting machine to extend outward relative to the center axis of the machine frame. The series of movements of the arm members performed repetitively during the harvesting procedure include a rearward movement, an extension movement, a retraction movement and a forward movement. The rearward movement moves the arm members away from the front portion of the machine frame and is broken down into a first portion and a second portion. The extension movement moves the arm members outward relative to the center axis of the machine frame and occurs during the first portion of the rearward movement of the arm members. The retraction movement moves the arm members inward relative to the center axis of the machine frame and occurs during the second portion of the rearward movement of the arm members. The forward movement moves the arm members toward the front portion of the machine frame. The picking members provide for an engagement of fruit during the retraction movement of the arm members to produce a picking pressure to sever the fruit from the fruit tree. These movements are repetitively performed during continuous movement of the harvesting machine along the row of trees.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a mechanical harvesting of fruit wherein the harvesting machine continuously advances adjacent a row of fruit trees during the harvesting.

Other object include;
a) to provide for a canopy penetration, fruit engagement and pressure building picking as the method of continuous advance harvesting.
b) to provide for a coordination of movement of a plurality of arm members relative to advance of the overall harvesting machine to provide for the desired picking actions.
c) to provide for an arm housing to retain the arm member.
d) to provide for an arm housing frame to retain the arm housing.
e) to provide for a reciprocating displacement of the arm housing frame generally parallel to a center axis of the harvesting machine.

f) to provide for a reciprocating displacement of the arm housing relative to the arm housing frame and generally perpendicular to the center axis of the harvesting machine.

g) to provide for a stationary insertion and withdraw of the arm member relative to a canopy of the tree wherein lateral movement of the arm member is minimized during continuous advance of the harvesting machine adjacent the tree.

h) to provide for a slight lateral displacement of the arm members while in the canopy of the tree to provide for a gathering motion of the arm members while in the canopy of the tree during continuous advance of the harvesting machine adjacent the tree.

i) to provide for picking members to extend from both lateral sides of each arm member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 4a and FIG. 4b are overhead plan views of a picking member in various operational orientations relative to a branch.

FIG. 5a and FIG. 5b are overhead plan views of the picking member depicted in FIG. 4a and FIG. 4b in various operational orientations relative to a stem and a fruit.

FIG. 6 is an overhead plan view of a section of an arm member having picking members extending from a single lateral side thereof with an arm guide positioned on the arm member.

FIG. 7 is an overhead plan view of a section of an arm member having picking members extending from both lateral sides thereof.

FIG. 8 is a side elevational view of a section of an arm guide.

FIG. 9 is a perspective view of a section of an arm guide.

FIG. 11a through FIG. 11f are overhead representations of a harvesting machine in various positional orientations during a series of movements.

DESCRIPTION

Overview

Figure 1:
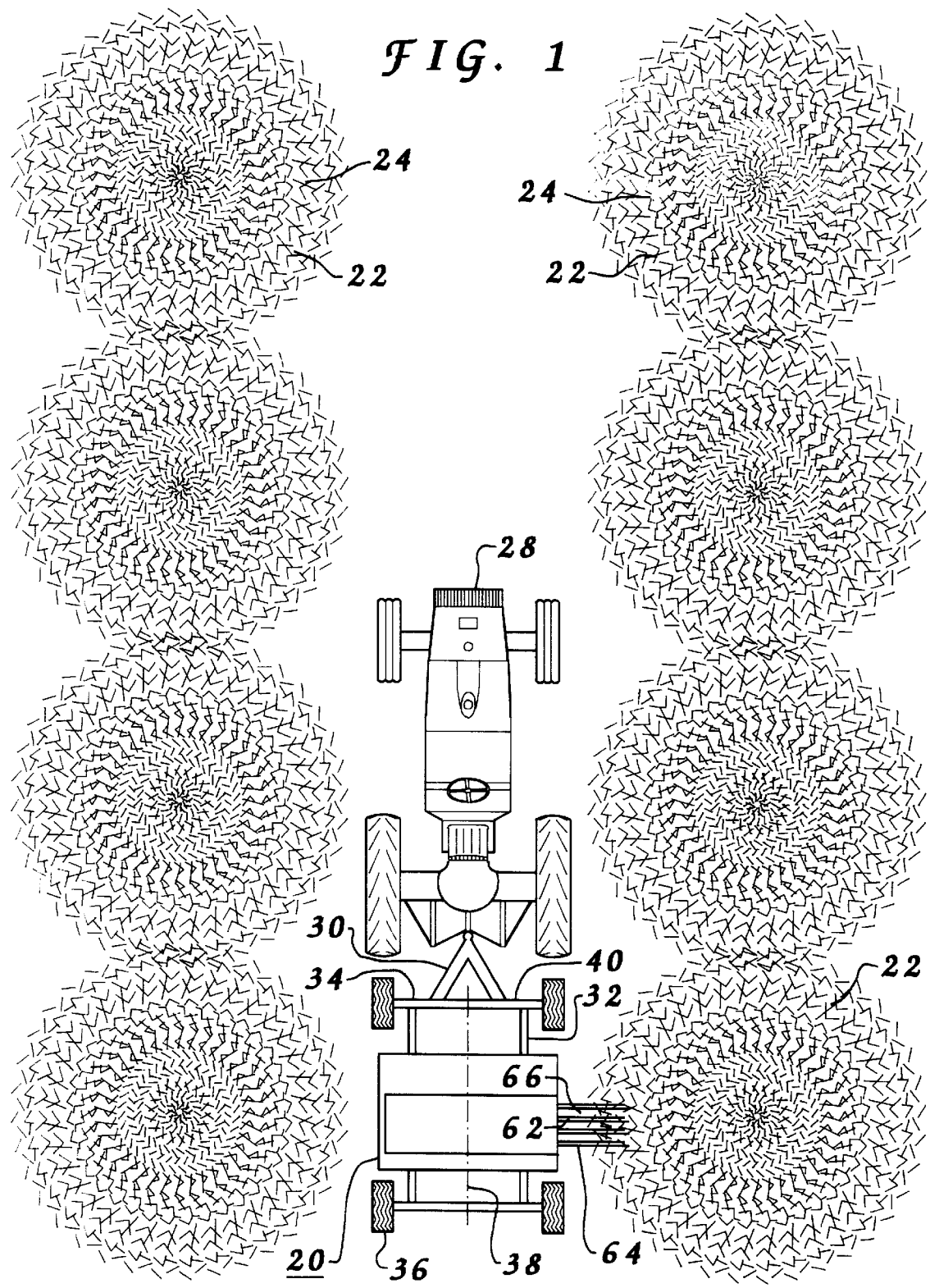
FIG. 1 is an overhead plan view of a harvesting machine attached to a tractor in a grove of trees.

Generally there are five requirements for harvesting machines having features of the present invention. The first is providing movement of the overall harvesting machine about a grove of citrus trees during usage. The second is providing arm members, each having a picking member attached thereto, and capable of penetrating the citrus trees during usage. The third is providing for containment of the arm members relative to an arm housing. The fourth is providing for a coordinated series of longitudinal and lateral displacements of the arm housing relative to a machine frame of the harvesting machine. The fifth is providing for production of a picking pressure to sever fruit engaged by any picking members during the coordinated lateral and longitudinal displacements of the arm members attached to the arm housing within the citrus tree. These requirements will be discussed separately below with reference to the drawings where like reference numerals refer to like parts throughout the various views.

The term harvesting procedure as used herein refers at least to those machine operations which occur while the picking members are in motion within the canopy of the fruit tree. The term center axis as used herein refers to an imaginary line passing through the center of the harvesting machine having features of the present invention from the front portion rearward and wherein the center axis remains generally parallel to a row of trees during movement of the harvesting machine adjacent thereto during the harvesting procedure.

FIG. 1 depicts a harvesting machine 20 capable of mechanical harvesting of a citrus crop from trees 22 situated in a row 24.

If desired multiple picking sets may be incorporated into a single harvesting machine. These picking sets may be identical or may be unique. The picking sets may be deployed on a single transport with a rigid positioning therebetween. More preferred, the picking sets may be linked together to provide more manoeuverability during movement within the grove.

One example of such an arrangement provides for three picking sets which are chained together to harvest the fruit from the trees. Due to the fact that more fruit grows toward the outer extent of each tree where sunlight is more abundant, it is possible to provide for these regions to receive greater coverage than interior regions of the trees. In the example which follows the forward most picking set has an arm member arrangement which provides for shallow penetration harvesting. This picking set removes a large proportion of the outermost crop from the outer side of the row of trees. The middle picking set has an arm member arrangement which provides for medium penetration harvesting. This picking set removes a large proportion of the interior crop and a large proportion of the exterior crop situated between adjacent trees. This picking set also acts to harvest a majority of any outermost crop missed by the forward most picking set. The rearward most picking set has an arm member arrangement which provides for full penetration harvesting. This picking set removes an extremely large proportion of the innermost crop from the row of trees. This picking set also acts to harvest a majority of any crop missed by the forward most picking set and the middle picking set. Such a system ensures that an extremely high percentage of the crop is harvested from the trees.

Figure 10:
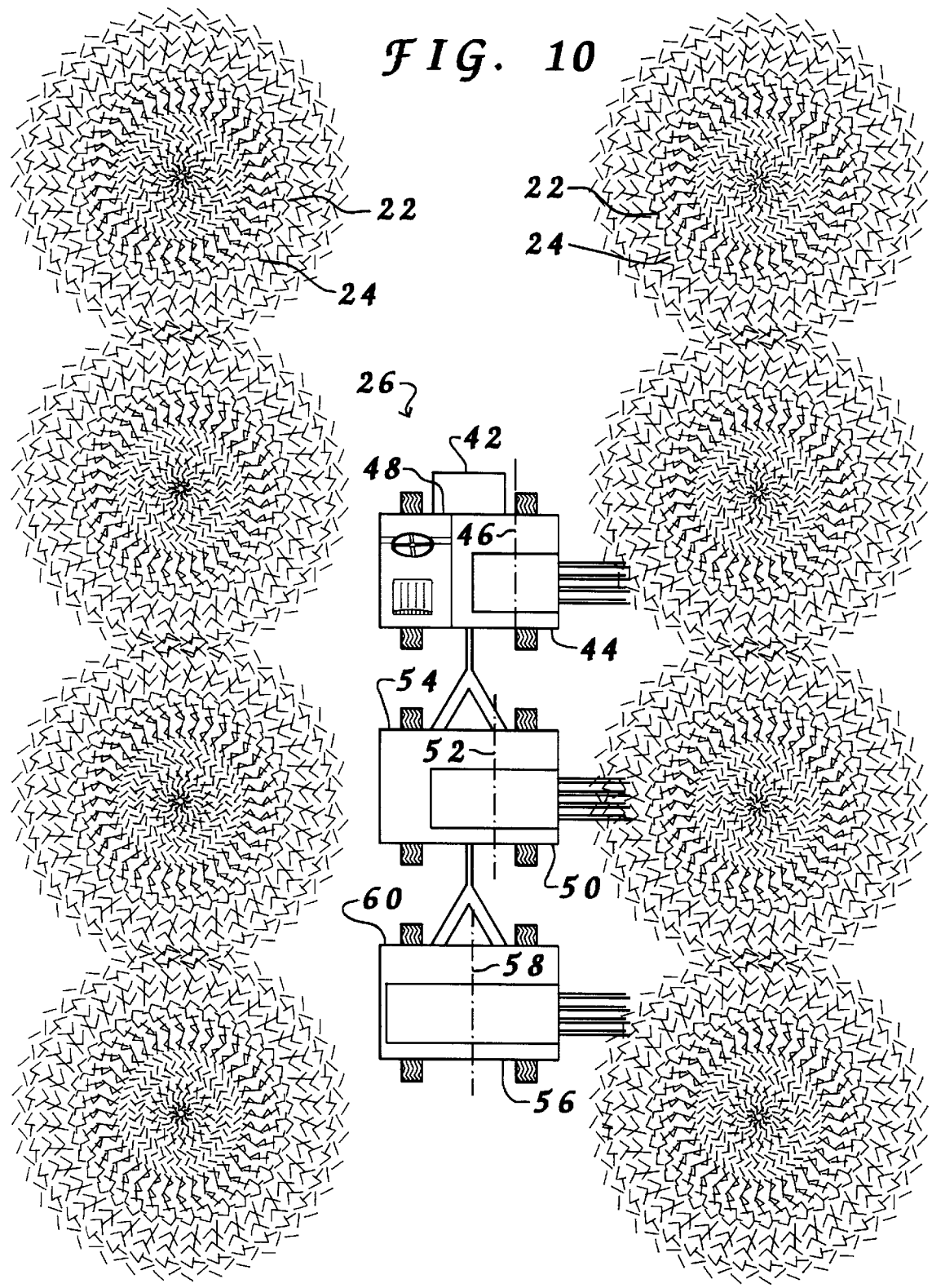
FIG. 10 is an overhead plan view of a harvesting machine having three (3) picking sets positioned in the grove of trees.

FIG. 10 depicts a harvesting machine 26 which is capable of mechanical harvesting of a citrus crop from trees 22 situated in row 24.

It is desirable to provide for a catching of any fruit falling from the trees during the harvesting procedure for subsequent conveyance to a storage unit or units. Many such catching and conveyance systems are well known in the art and many of these systems may be employed to satisfy this desire.

Movement of Overall Harvesting Machine

It is a requirement of the present invention that the overall harvesting machine be capable of moving, or being moved, within a grove of trees and specifically along and adjacent to a row of such trees. This desire may be satisfied by providing the overall harvesting machine with propulsion means and direction control means. Alternatively, the harvesting machine may be attached to another vehicle such as a tractor. This may be accomplished by providing wheels on the harvesting machine or by mounting the harvesting machine on the vehicle where the harvesting machine is physically carried by the vehicle.

Preferably the speed of the harvesting machine will be constant during a harvesting operation. Alternatively, it is possible, and in certain situations desirable, to provide for a repetitive series of increasing and decreasing rates of velocity of the harvesting machine timed to other motion actions of the harvesting machine during the harvesting operation. It is possible, and in many case preferred, to provide the harvesting machine with the capacity to harvest fruit from opposing rows of tree simultaneously during movement of the harvesting machine therebetween. In this situation it is desirable to provide for extension of one or both harvesting sets outward toward the respective row of trees. This arrangement provides for use of the harvesting machine in groves having differing spacing between adjacent rows of trees while ensuring proper positioning of the harvesting machine relative to each row.

As depicted in FIG. 1 a tractor 28 may pull harvesting machine 20 using a coupling 30. Harvesting machine 20 has a machine frame 32 which connects to axles 34. Each axle 34 has wheels 36 attached at opposing ends. Machine frame 32 has a center axis 38 extending therethrough and a front portion 40. During the harvesting procedure center axis 38 will remain relatively parallel to row 24.

As depicted in FIG. 10 harvesting machine 26 may be self propelled by a power source 42 mounted directly thereon. A forward most picking set 44 has a center axis 46 extending therethrough and a front portion 48. A middle picking set 50 has a center axis 52 extending therethrough and a front portion 54. A rearward most picking set 56 has a center axis 58 extending therethrough and a front portion 60.

Arm Members with Picking Members

Harvesting machines having features of the present invention will have a plurality of arm members attached thereto in at least one vertically oriented row. Each of these arm members will have at least one picking member extending therefrom. Those harvesting machines which operate on a single side of a single row will have all of the arm members positioned to face outward from the side of the harvesting machine from the center axis of the harvesting machine. Those harvesting machines which operate on opposing rows of trees while moving therebetween will have opposing sets of arms facing generally in opposing directions away from the center axis of the harvesting machine.

The arm members preferably will be linearly aligned, or straight, and of a relatively significant length. This length should ensure adequate penetration of the canopy of the row of tree to at least slightly beyond midpoint, or tree trunk depth, while the harvesting machine is positioned adjacent the row of trees.

Figure 2:
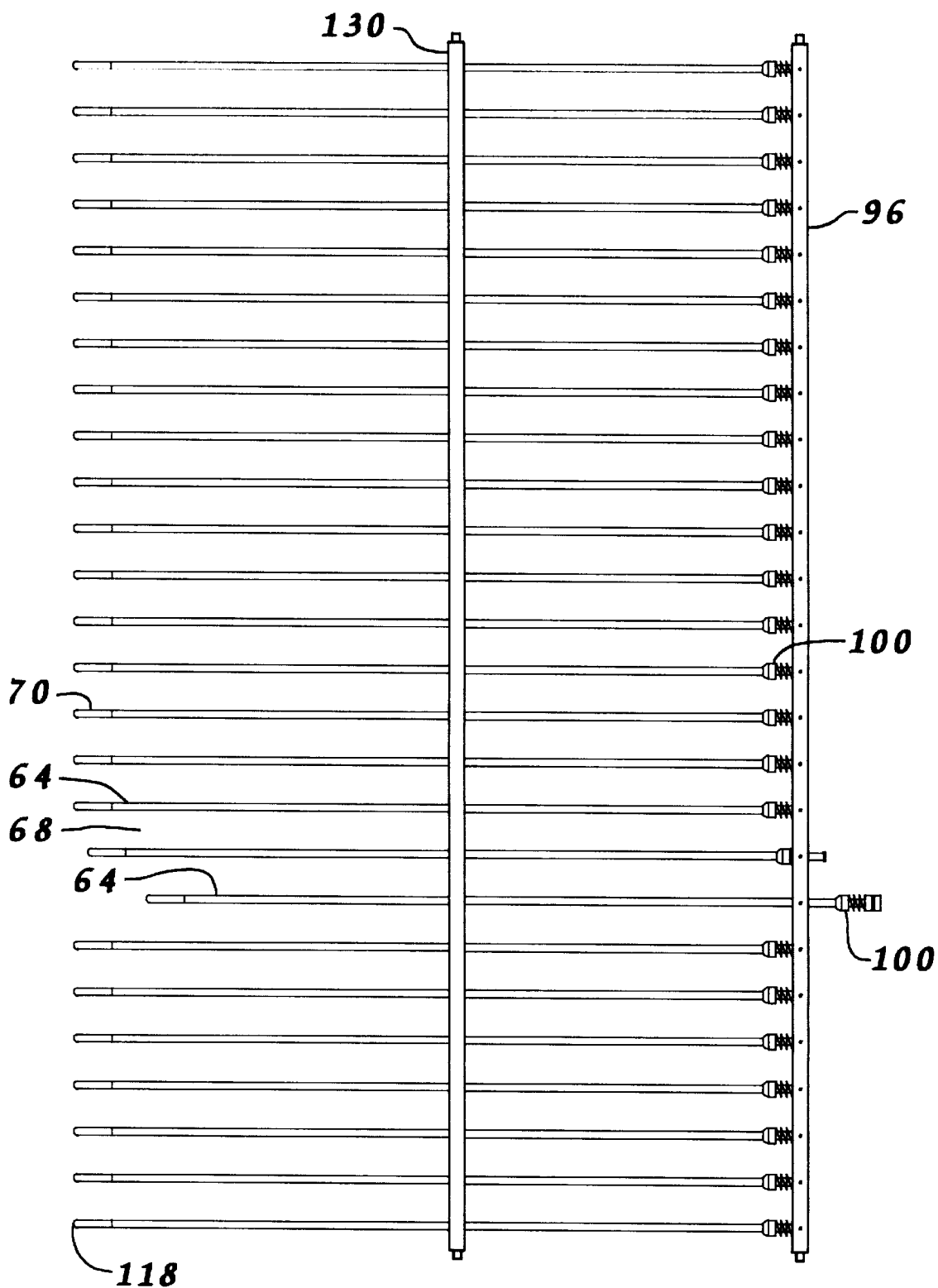
FIG. 2 is a front elevational view of a plurality of arm members attached to an arm housing and supported by an arm guide.

FIG. 1 illustrates a plurality of horizontally disposed rows 62 each having a plurality of arm members 64 therein. Arm members 64 are depicted during penetration of tree 22 during a harvesting procedure. FIG. 1 illustrates a uniform spacing 66 between adjacent horizontally disposed rows 62. FIG. 2 illustrates a uniform spacing 68 between adjacent vertically disposed arm members 64.

The picking members will extend from the arm members and have a trapping cavity thereon or formed between the picking member and the arm member. This trapping cavity will provide for engagement of the stem of fruit during select movement of the picking member within the canopy of the tree. Subsequent to this engagement additional movement of the picking member will produce a picking pressure between the fruit and the stem or between the stem and the parent tree to provide for a severing of the fruit from the parent tree. The picking members may extend from a single side of the arm member or from opposing sides. The picking members may be attached to a terminal end of the arm member or along the length of the arm member using any method conventionally known in the art.

Referring now to FIG. 2, FIG. 4a through FIG. 5b and FIG. 6, an end picking member 70 is shown secured to the distal end of arm member 64. An intermediate picking member 72, see FIG. 6, is insertable into arm member 64. Flush mount screws 74 engage mounting apertures 76 to secure end picking member 70 to arm member 64. A guide point 78 and an engaging extension 80 provide for penetration of tree 22 with minimal resistance.

FIG. 7 depicts a double sided end picking member 82 capable of harvesting fruit on each of the opposing horizontally disposed sides of arm member 64. FIG. 7 also depicts a double sided intermediate picking member 84 installed within arm member 64 and also capable of harvesting fruit on each side of arm member 64.

Various means may be employed to provide for various yielding of the picking member relative to the arm member during movement about the canopy of the tree to prevent damage to the tree or to the harvesting machine. These yieldings involve those during insertion of the picking member/arm member combination into the canopy and those during withdraw therefrom. Such yieldings being desirable to minimize damage which may otherwise be inflicted upon the parent tree or the crop contained thereon. These yielding means may involve simple resilient formation of the picking member or the arm member adjacent the picking member. A particularly expedient method of formation involves forming the picking member of an elastic material such as rubber or a synthetic material having similar properties. Alternatively, the picking member may have mechanical parts which provide for the desired yielding(s).

Referring now to FIG. 4a and FIG. 4b, occasionally engagement of branch 86 will occur which will not slide through end picking member 70. One such example is when engagement occurs to branch 86 in close proximity to separation from a larger branch and the orientation of branch 86 is relatively vertical. Another example occurs when intertwining of branch 86 occurs with other branches 86 which tend to anchor the free end of branch 86 so that free movement is not possible.

One method of providing for release is to make engaging extension 80 pivotal to the remainder of end picking member 70. A one piece pliant material can be utilized to form end picking member 70. This is particularly desirable due to the lack of moving parts which may engage and become entangled with branches 86 or other portions of the tree. An opening 88, bordered by the body of end picking member 70, a deflecting bridge 90 and an engaging bridge 92, permit this pivotal motion. FIG. 4a illustrates end picking member 70 in the normal position. During release, as shown in FIG. 4b, deflecting bridge 90 deforms into opening 88 while engaging bridge 92 stretches and straightens. Engaging extension 80 pivots to point toward the distal end of end picking member 70 and release of branch 86 occurs during continued retraction of end picking member 70. Following release of branch 86, engaging extension 80 returns to the normal position and is set to engage further branches 86 and fruit 94, see FIG. 5a and FIG. 5b. Such a release system may be applied to any deployed picking members.

Arm Housing

Harvesting machines having features of the present invention will have a plurality of arm members secured relative to an arm housing. In the simplest form the arm housing will comprises only those structures necessary to contain the arm members. The arm members may be arranged in a single vertically disposed row or, more preferably, will be arranged in multiple vertically disposed rows. When multiple rows are deployed the arm housing may be a single member having all of the arm members attached thereto, or, more preferred, may be the collection of connected individual columns. Typically, this row, or rows, will be of a sufficient height so as to provide for harvesting of fruit from the uppermost extent of subject fruit trees.

Each of the arm members will have a connection end which will be secured relative to the arm housing. Such securement will occur near or at a rearward most extent of the arm member.

Figure 3:
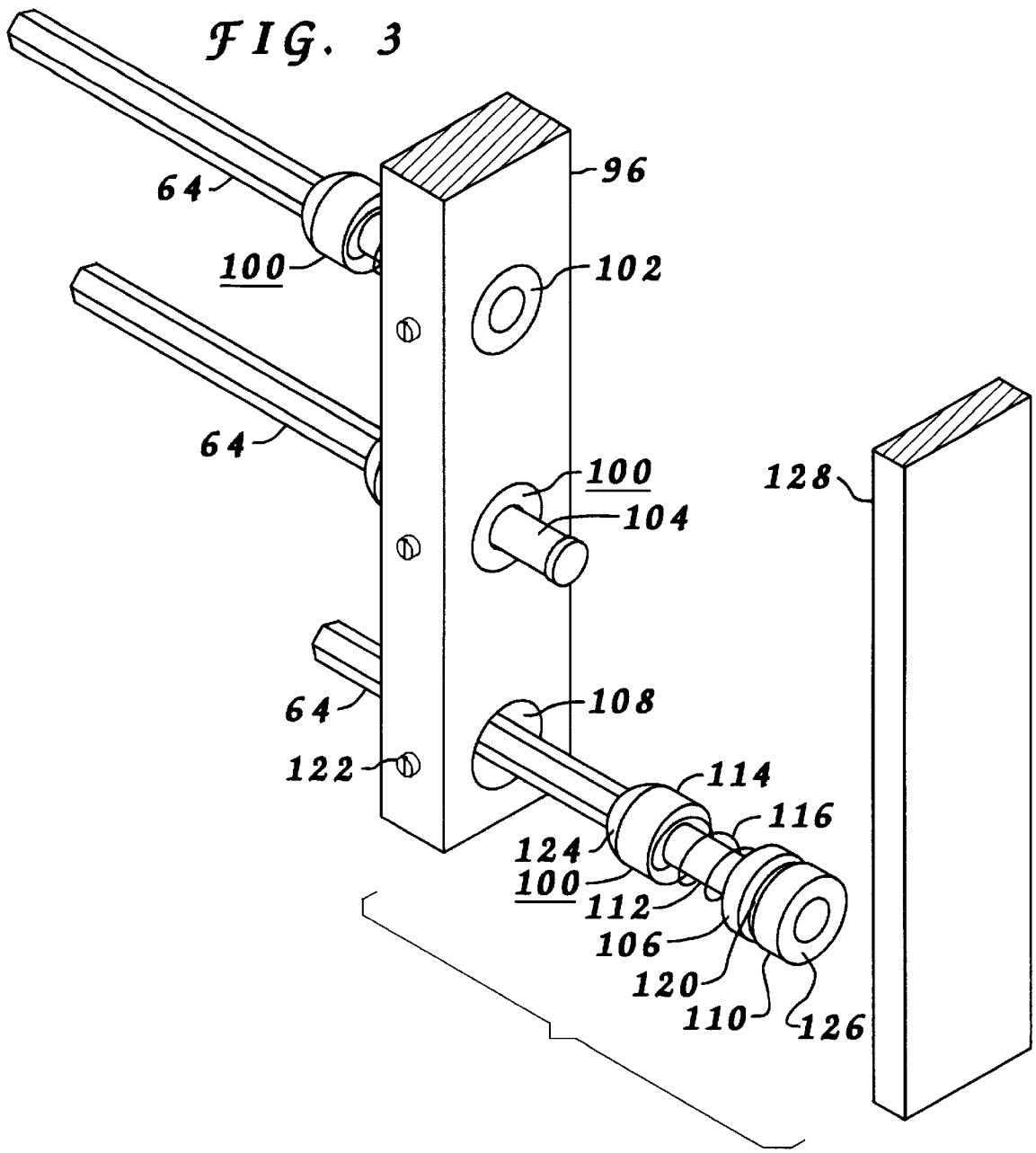
FIG. 3 is a sectional perspective view of a series of three dual pressure yielding units.

Referring now to FIG. 2 and FIG. 3 an arm housing 96 carries arm members 64 for movement relative to the harvesting machine while providing for a supporting contact with arm members 64. Arm members 64 are displaced for penetration of and withdrawal from the canopy of the tree because of manipulation of, and movement of, arm housing 96.

It is possible to provide for the upper most arm members, while identical to the remaining arm members in construction and length if preferred, to be positioned for better penetration of the upper portions of the tree being harvested. This is easily accomplished by providing for each successively higher arm member to be offset outward from the prior. Due to the physical characteristics of citrus trees, a large quantity of fruit exist at the upper periphery of the tree where sunlight is plentiful.

Figure 13:
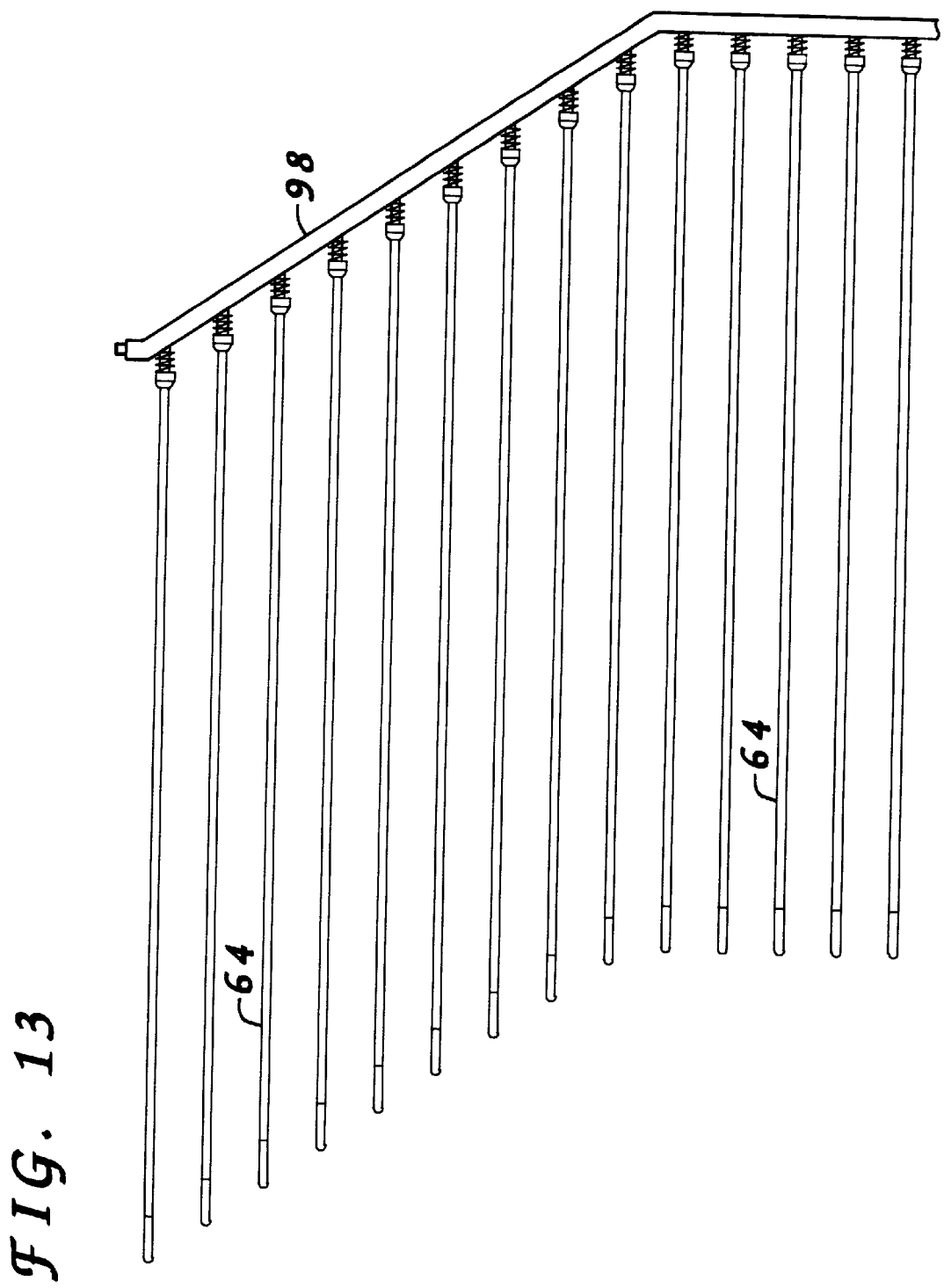
FIG. 13 is a front elevational view of a section of an upper arm set.

As depicted in FIG. 13 an arm housing 98 permits further lateral extension by arm members 64 to provide for proper and complete penetration of the upper extent of the tree.

Preferably, each arm housing/arm member combination will incorporate an insertion yielding system relative to the arm housing in the event of engagement of an obstruction during longitudinal displacement of the arm member during the harvesting procedure. This yielding acts to prevent damage from being inflicted upon either the harvesting machine or the tree being harvested. Ideally, such yielding will utilized a dual pressure responsive system wherein in response to resistance passing a first level of resistance a first yielding to further longitudinal displacement occurs. If this event occurs one of two events will eventually occur, either the resistance will fall below the first level of resistance or the resistance will exceed a second level of resistance which is greater than the first level of resistance. In the event that the resistance level drop below the first level of resistance without first reaching the second level of resistance, than the arm member returns to a standard deployment position and harvesting continues as normal for that arm member. In the event that the resistance level exceed the second level of resistance than the arm member is released from the arm housing and little or no further pressure is applied to the obstruction by the arm member. In this instance the arm member most likely would not complete a normal cycle of motions during the harvesting procedure and would not act to pick a normal quantity of fruit. If a specific arm member is released from the arm housing during a harvesting cycle that arm is mechanically returned to the standard deployment position prior to commencement of the subsequent harvesting cycle.

FIG. 3 depicts arm housing 96 having arm members 64 attached thereto. During penetration of the tree, not shown in this view, each arm member 64 is subject to striking a branch and meeting resistance. When such an obstruction is met, if arm member 64 continues penetration, damage may be inflicted upon the tree or upon a portion of the harvesting machine. An impact absorbing member 100 prevents such damage by utilizing a dual pressure yielding arrangement. Impact absorbing member 100 has a deployed orientation 102, a yield orientation 104 and a release orientation 106. Deployed orientation 102 is depicted as is routine in the absence of significant resistance. Yield orientation 104 is depicted as occurs when a resistance pressure is above a first level of resistance. Release orientation 106 is depicted as occurs when the resistance pressure is above a second level of resistance.

Deployed orientation 102 is the normal positioning of arm member 64 relative to arm housing 96. In this position arm member 64 advances with arm housing 96 and is capable of penetration of the canopy of the fruit tree. This positioning allows picking members, not shown in this view, to perform a function of engaging fruit proximate the stem, also not shown, and produce a picking pressure to severe the fruit from the tree during the retraction period.

Yield orientation 104 occurs when resistance pressure exceeds the first level of resistance, yet fails to obtain the second level of resistance. This allow for a slight yielding while allowing time for arm member 64 to become free of the obstruction which is creating the resistance pressure. If arm member 64 becomes free, arm member 64 returns to deployed orientation 102.

Release orientation 106 occurs when resistance pressure exceeds the second level of resistance. In this occasion, impact absorbing member 100 releases from arm housing 96. Arm member 64 is then free from any further displacement forward which results from movement of arm housing 96 during the extension period. This reduces, or eliminates, the potential for damage to the harvesting machine, or any portion thereof, as well as the fruit tree.

Arm housing 96 has an aperture 108 therethrough for each arm member 64. Impact absorbing member 100 mounts within aperture 108 while in deployed orientation 102 and yield orientation 104. Impact absorbing member 100 comprises a mount 110, a shaft 112, a block 114 and a spring 116. Shaft 112 rigidly extends from block 114 while slidably engaging mount 110. Spring 116 biases mount 110 to remain spaced from block 114 in the absence of pressure along arm member 64 from a distal end 118, see FIG. 2.

Mount 110 has a trench 120 which mates with a portion, not shown, of a biased shaft 122 to retain mount 110 within aperture 108 in the absence of significant pressure along arm member 64 from distal end 118. When a first level of resistance is met spring 116 compresses and shaft 112 moves within mount 110 to allow arm member 64 to be longitudinally displaced relative to arm housing 96. When a second level of resistance is met biased shaft 122 releases mount 110 from aperture 108.

Block 114 has a taper 124 which allows impact absorbing member 100 to be reseated within aperture 108 when pressure is applied to an end 126 of mount 110 by a reset member 128 at the conclusion of the withdrawal motion.

It is possible, and in certain situations desirable, to provide a forward guide to slidably engage each arm member. Such a guide may be mechanically manipulated when a lateral displacement is desired to ensure adequate movement of the arm member in response to the manipulation. Preferably, the forward guide will permit passage thereby of any picking members attached to the respective arm member.

When the picking members extend only from one side of a respective arm member 64 a guide member 130, see FIG. 2 and FIG. 6, ensures a proper elevational alignment of each arm member 64 during each repetitive cycle.

The principal contact for arm members 64 is provided by arm housing 96 which secures one end of arm members 64 during usage, see FIG. 2. A second contact point along the arm members ensures true movement of the arm members and to provide leverage during the gathering motion, if utilized. Many secondary contacts possibilities exist. Preferably the secondary contact is a slidable mount, although a second movable arm housing is possible. Referring to FIG. 8, a guide member 132 having a slidable mount 134 provides a complete enclosure. Open engagements allow attachments on the arm members to pass the secondary contact, as shown in FIG. 6 and FIG. 9. This open engagement allows the deployment of multiple picking members on each arm member.

As detailed elsewhere herein, each arm member 64 will have attached thereto at least one picking member 70, 72, 82 or 84. Picking member 70, 72, 82 or 84 must extend substantially horizontally to properly engage fruit. Arm member 64 may be of a construction so that it has a plurality of planar surfaces 136, shown in FIG. 6. These planar surfaces 136 cooperate with planar surfaces 138 of guide member 130, see FIG. 9, to prevent rotation therein.

Longitudinal and Lateral Displacement of Arm Housing

The arm housing will be displaceably attached relative to the overall harvesting machine so as to be repetitively displaced in a series of movements. During the harvesting operation these series of movements will occur while the overall harvesting machine continuously advances along the row of trees. This series of movements will include movements rearward and forward along the harvesting machine as well as away from or toward the center axis.

Many systems are known in the art to move one object, even a relatively heavy object, relative to another. Many of these systems may be employed for the present invention to provide the desired longitudinal and lateral displacement of the arm members relative to the machine frame.

Typically, the arm housing will first experience a rearward movement from a beginning position while simultaneously experiencing an extension movement wherein the arm members may move into the canopy of the tree. Then the arm housing will experience a retraction movement while continuing to experience the rearward movement wherein the arm members may move out of the canopy of the tree. Then the arm housing will experience a forward movement to return to the beginning position. This arrangement provides for the arm to experience a different pace relative to the canopy as compared to the pace experienced by the overall harvesting machine. Utilizing this arrangement it is possible to provide for the arm members to be relatively stationary laterally relative to the canopy of the tree during the insertion and withdrawal therefrom. Alternatively, it is possible to provide for any desired amount of lateral displacement of the arm members relative to the canopy and at any desired point in the cycle. This lateral displacement may be isolated to a gathering motion while fully extended into the canopy of the tree wherein the sides of the arm members are brought into contact with branches and stems to enhance the picking properties of the picking members.

FIG. 11a through FIG. 11f depict a representation of harvesting machine 20 positioned in six (6) relative orientations which cooperate to define a series of movements. It being noted that harvesting machine is continually advancing during the entire series of movements from a beginning positional orientation 140 depicted within FIG. 11a to an ending positional orientation 142 depicted in FIG. 11f. These views each depict machine frame 32, an arm housing frame 144, arm housing 96 and a plurality of arm members 64. Machine frame 32 has front portion 40 and center axis 38.

FIG. 11a depicts arm housing frame 144 fully advanced on machine frame 32 toward front portion 40 and arm housing 96 fully retracted within arm housing frame 144 relative to center axis 38. Harvesting machine 20 is now in beginning positional orientation 140. This positioning would typically represent placement at the beginning of each of the series of movements.

FIG. 11b depicts harvesting machine 20 following travel a first measure of distance forward. Arm housing frame 144 has been displaced following rearward movement along machine frame 32 away from front portion 40 a distance approximately equal to the advance of harvesting machine 20. Simultaneous to such movement of arm housing frame 144 arm housing 96 has undergone an extension movement within arm housing frame 144 relative to center axis 38. Arm members 64 have been extended outward from harvesting machine 20 while remaining laterally stationary.

FIG. 11c depicts harvesting machine 20 following continued travel the first measure of distance forward. Arm housing frame 144 has been further displaced following continued rearward movement along machine frame 32 away from front portion 40 a distance approximately equal to the advance of harvesting machine 20. Simultaneous to such rearward movement of arm housing frame 144 arm housing 96 has undergone an additional extension movement within arm housing frame 144 relative to center axis 38. Arm members 64 have now been fully extended outward from harvesting machine 20 while remaining laterally stationary.

FIG. 11d depicts harvesting machine 20 following continued travel the first measure of distance forward. Arm housing frame 144 has been further displaced following continued rearward movement along machine frame 32 away from front portion 40 a distance approximately equal to the advance of harvesting machine 20. Simultaneous to such rearward movement of arm housing frame 144 arm housing 96 has undergone a retraction movement within arm housing frame 144 relative to center axis 38. Arm members 64 are now extended outward from harvesting machine 20 but beginning there inward travel while remaining laterally stationary.

FIG. 11e depicts harvesting machine 20 following continued travel the first measure of distance forward. Arm housing frame 144 has now been fully displaced rearward following continued rearward movement along machine frame 32 away from front portion 40 a distance approximately equal to the advance of harvesting machine 20. Simultaneous to such rearward movement of arm housing frame 144 arm housing 96 has undergone a continued retraction movement within arm housing frame 144 relative to center axis 38. Arm members 64 are now fully retracted relative to harvesting machine 20 while remaining laterally stationary.

FIG. 11f depicts harvesting machine 20 following continued travel a distance approximately equal to twice the measure of distance of each of the prior forward advances depicted. Arm housing frame 144 has now been fully displaced forward following forward movement along machine frame 32 toward front portion 40. Arm housing 96 has remained stationary relative to arm housing frame 144 during this movement. Arm members 64 have remained fully retracted relative to harvesting machine 20 while advancing a significantly greater distance than the advance of harvesting machine 20.

Many configurations are possible including the number of rows of arm members deployed, spacing therebetween, displacement cycles including timing and distances, and harvesting patterns utilized. The example which follows is only intended to explain the principles of one of these configurations.

In this example four (4) rows of arm members are deployed with a spacing between adjacent rows of nine inches (9") center to center. Each cycle of the series of movements is completed following twelve inches (12") of travel of the harvesting machine over the ground. During the first four inches (4") of machine advance the arm members are extended to there full depth of penetration and displaced rearward four inches (4") on the machine. During the next four inches (4") of machine advance the arm members are fully retracted and displaced an additional four inches (4") rearward on the machine. During the next four inches (4") of machine advance the arm members are displaced forward eight inches (8") on the machine. This series of movements is then repeated repetitively. Following initial performance of this pattern this series begins to produce in repetition a penetration of the canopy of the trees by a row of arm members each and every three inches (3") with little or no lateral (parallel to advance of the machine) movement of the arm members within the canopy of the trees.

Figure 12A:
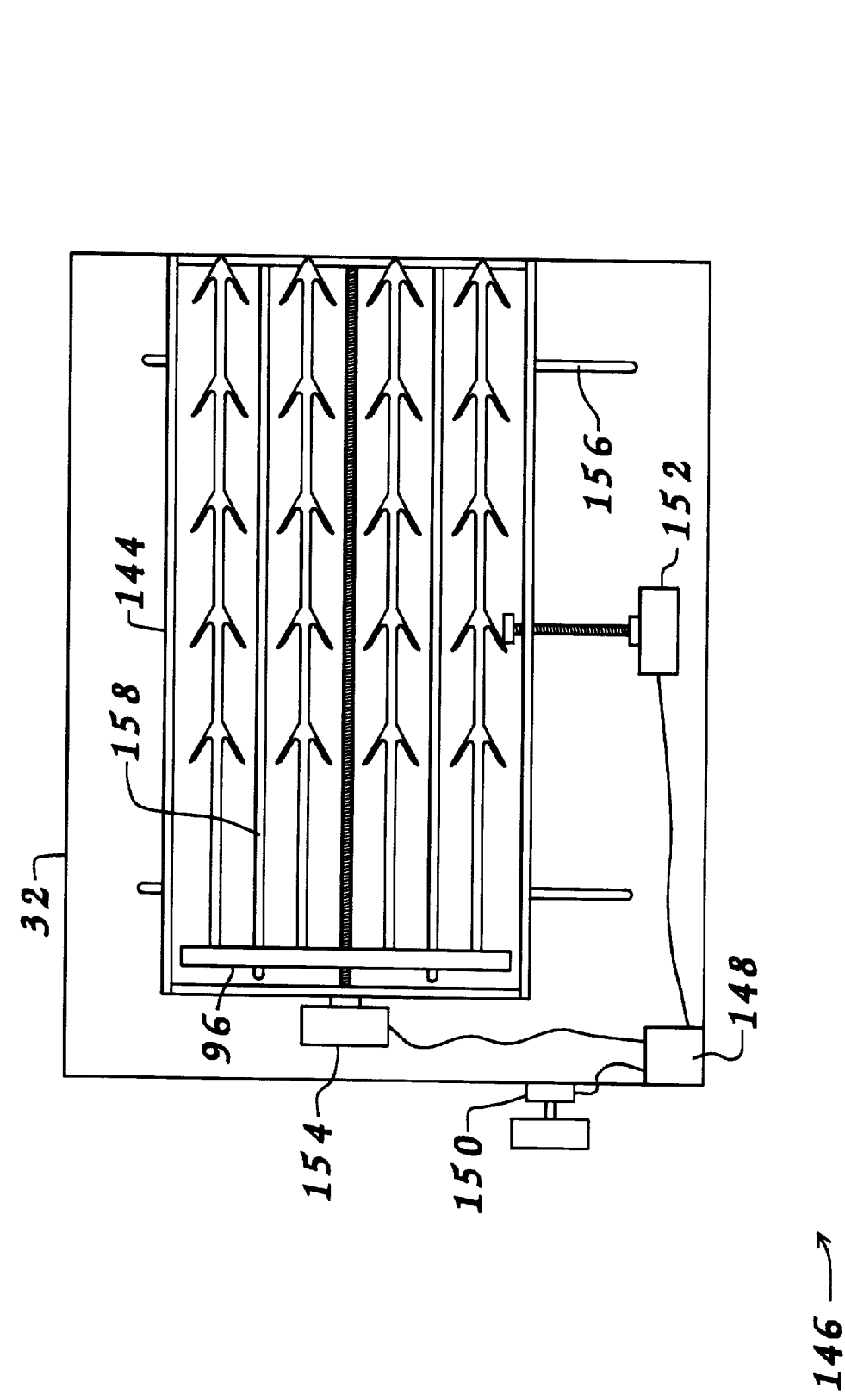
FIG. 12a and FIG. 12b are overhead representation of a harvesting machine in various positional orientations.
Figure 12B:
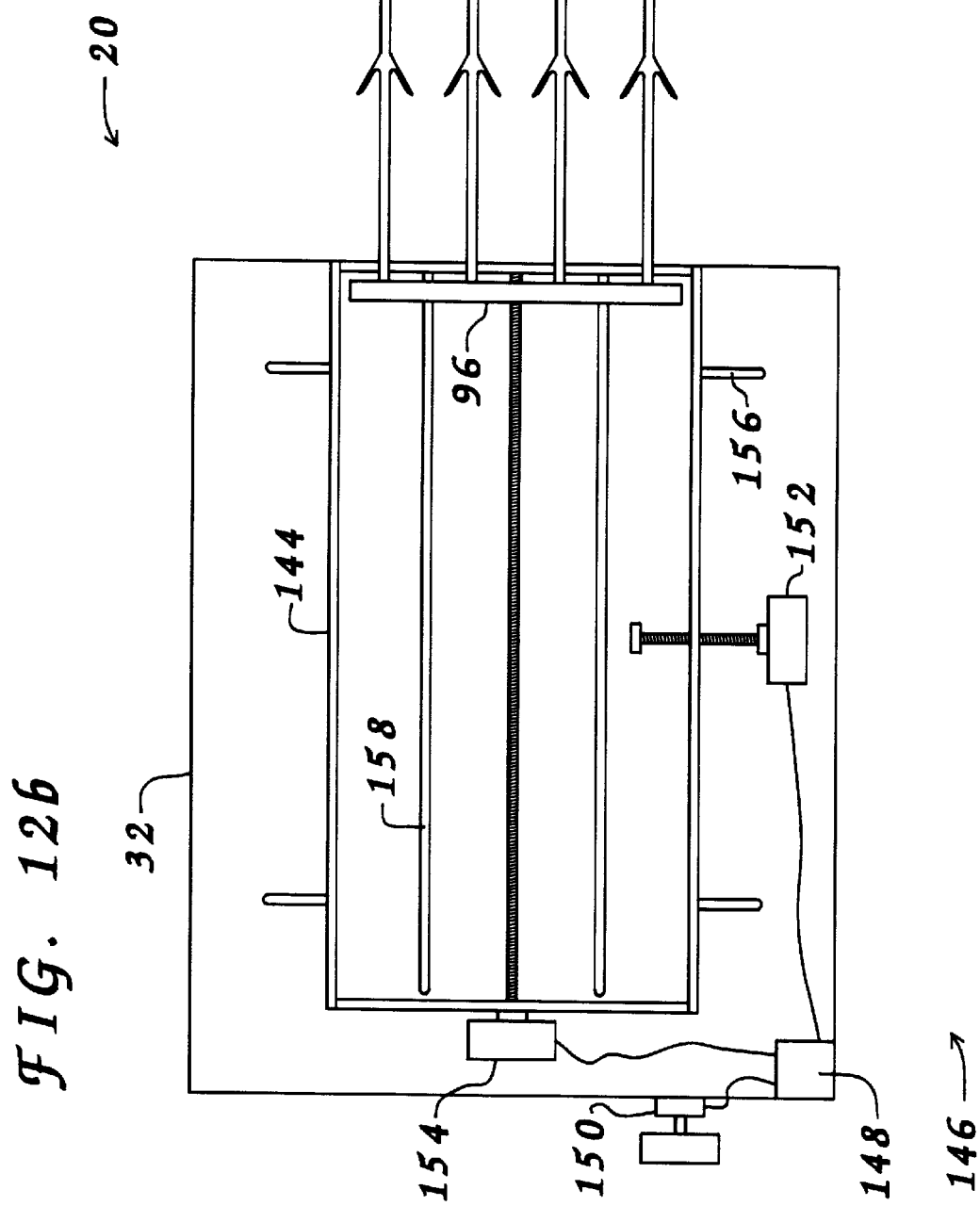

FIG. 12a and FIG. 12b depicts a drive assembly 146 capable of producing the above defined series of motions. A control unit 148 acts to receive input from a measuring device 150 which is in contact with the ground to determine travel of harvesting machine 20 therealong. Control unit 148, as conventionally known in the art, contains means to make computations and issue instruction resulting from those computations. Control unit 148 then sends a signal to a longitudinal drive assembly 152 and a lateral drive assembly 154. Longitudinal drive assembly 152 controls rearward and forward displacement of arm housing frame 144 relative to machine frame 32. Lateral drive assembly 154 controls outward and inward displacement of arm housing 96 relative to arm housing frame 144. In this embodiment longitudinal drive assembly 152 must be capable of producing a range of motion of eight inches (8") to arm housing frame 144 along machine frame 32. Arm housing frame 144 is guided and restrained by opposing guide channels 156 positioned within machine frame 32. In this embodiment lateral drive assembly 154 must be capable of producing a range of motion of seventy-two inches (72") to arm housing 96 along arm housing frame 144. Arm housing 96 is guided and restrained by opposing guide channels 158 positioned within arm housing frame 144. If a gathering motion is desired control unit 148 may pause (or accelerate) displacement of arm housing frame 144 along machine frame 32 while arm housing 96 is fully extended outward relative to arm housing frame 144. Many other gathering motions may be produced.

Picking Pressure

The picking member, which is attached to extend from the arm member, may trap a piece of fruit adjacent the stem of the fruit during the retraction movement of the respective arm member. During continued movement of the picking member a picking pressure develops until the fruit is severed from the tree.

Referring now to FIG. 5a and FIG. 5b guide point 78 and engaging extension 80 provide for penetration of a tree, depicted by fruit 94 and a stem 160, with minimal resistance. Following insertion arm member 64 is withdraw from the tree. During this sliding engagement any fruit 94 attached to branch 86, see FIG. 4a and FIG. 4b, or any fruit 94 attached to stem 160 comes into contact with an engaging surface 162 and gripping occurs by the main body of end picking member 70 and engaging extension 80. Pressure builds during further retraction of arm member 64, until a picking pressure is obtained to separate fruit 94 from stem 160.

If a gathering motion is provided, the arm members are displaced to move the side of the arm members into contact with branches. Following this gathering motion, the arm members are withdrawn while branches are held against the arm members. This motion brings branch into contact with an engaging surface of the respective arm member, being one of the opposing lateral sides.

With respect to the above description then, it is to be realized that the optimum dimensional relationships for the parts of the invention, to include variations in size material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A harvesting machine to provide for a mechanically harvesting of fruit from a fruit tree, the harvesting machine comprising:

a) a machine frame having a front portion and a center axis;

b) a plurality of arm members positioned on the harvesting machine to extend outward relative to the center axis of the machine frame;

c) continuous movement means to provide for a continuously advance of the machine frame during a harvesting procedure;

d) transfer means to provide for a repetitive performance of a series of movements during a harvesting procedure, the series of movements comprising:

i) a rearward movement of the arm members away from the front portion of the machine frame, the rearward movement having a first portion and a second portion;

ii) an extension movement of the arm members outward relative to the center axis of the machine frame, the extension movement occurring during the first portion of the rearward movement of the arm members relative to the center axis of the machine frame, the arm members remaining generally perpendicular to the center axis of the machine frame during the extension movement;

iii) a retraction movement of the arm members inward relative to the center axis of the machine frame, the retraction movement occurring during the second portion of the rearward movement of the arm members relative to the center axis of the machine frame, the arm members remaining generally perpendicular to the center axis of the machine frame during the retraction movement;

iv) a forward movement of the arm members toward the front portion of the machine frame;

e) a picking member attached relative to each arm member, each picking member attached to a respective arm member to provide for an engagement of fruit to produce a picking pressure to sever the fruit from the fruit tree during the retraction movement of the respective arm member.

2. The harvesting machine defined in claim 1 further comprising:

a) an arm housing to provide for a containment of the plurality of arm members;

b) an arm housing frame to provide for a containment of the arm housing; and wherein the arm housing frame is linearly displaceable along the machine frame to provide for the rearward movement and the forward movement of the series of movements;

and wherein the arm housing is linearly displaceable relative to the arm housing frame to provide for the extension movement and the retraction movement of the series of movements.

3. The harvesting machine defined in claim 1 wherein the plurality of arm members are positioned on the harvesting machine in a plurality of vertically aligned rows, each vertically aligned row having a plurality of arm members positioned therein.

4. The harvesting machine defined in claim 3 wherein each of the vertically aligned rows has a spacing from an adjacent row and wherein all of the spacings are an identical measurement of distance.

5. The harvesting machine defined in claim 1 wherein a rearward speed of the rearward movement of the arm members during each of the series of movements matches a forward speed of the continuous advance of the machine frame during the harvesting procedure wherein relative to the fruit tree arm members exert only the extension movement and the retraction movement upon the fruit tree during the series of movements.

6. The harvesting machine defined in claim 1 wherein a rearward speed of the rearward movement of the arm members during each of the series of movements has at least a portion thereof which is unique relative to a forward speed of the continuous advance of the machine frame during the harvesting procedure wherein relative to the fruit tree arm members exert the extension movement and the retraction movement upon the fruit tree during the series of movements and also exerts a lateral displacement during the series of movements to produce a gathering motion wherein a side of each respective arm members come into contact with an adjacent portion of a canopy of the fruit tree.

7. The harvesting machine defined in claim 1 wherein the arm members are further positioned in:

a) a lower arm set wherein the positioning of the arm members of the lower arm set are each generally aligned vertically from a lowest lower arm set member to a highest lower arm set member along a longitudinal length of each arm member;

b) an upper arm set positioned above the lower arm set wherein the positioning of the arm members of the upper arm set are each generally offset outward along a longitudinal length relative to each lower arm member from a lowest upper arm set member to a highest upper arm set member.

8. The harvesting machine defined in claim 1 further comprising multiple picking sets wherein each of the multiple picking sets comprises the plurality of arm members, the transfer means and the picking members.

9. A harvesting machine to provide for a continuous advance mechanically harvesting of fruit from a fruit tree during a harvesting procedure, the harvesting machine comprising:

a) a machine frame having a center axis;

b) movement means to provide for a continuous advance of the machine frame during the harvesting procedure;

c) an arm housing frame mounted relative to the machine frame;

d) longitudinal transfer means to provide for:
    i) a rearward movement of the arm housing frame relative to the center axis of the machine frame;
    ii) a forward movement of the arm housing frame relative to the center axis of the machine frame;

e) an arm housing mounted relative to the arm housing frame;

f) lateral transfer means to provide for:
    i) an extension of the arm housing outward relative to the arm housing frame during at least a portion of the rearward movement of the arm housing frame relative to the center axis of the machine frame, the extension occurring generally perpendicular to the center axis of the machine frame;
    ii) a retraction of the arm housing inward relative to the arm housing frame during at least a portion of the rearward movement of the arm housing frame relative to the center axis of the machine frame, the retraction occurring generally perpendicular to the center axis of the machine frame;

g) a plurality of arm members positioned relative to the arm housing to extend outward from the center axis of the machine frame;

h) a picking member attached relative to each arm member to provide for engaging fruit to sever the fruit from a respective tree during the retraction of the arm housing of the lateral transfer means.

10. The harvesting machine defined in claim 9 wherein each picking member further comprises a picking member attachment assembly, each picking member attachment assembly comprising:

a) deployed positioning means to provide for the arm member to be retained in a deployed orientation relative to the arm housing;

b) displacement yield means to provide for a first yielding of the arm member relative to the arm housing into a yielding orientation from the deployed orientation in response to a resistance pressure during the extension of the lateral transfer means wherein the resistance pressure exceeds a first level of resistance;

c) redeployment means to provide for the arm member to return to the deployed position from the yielding orientation if the resistance pressure falls below the first level of resistance prior to reaching a second level of resistance;

d) displacement release means to provide for a second yielding of the arm member relative to the arm housing into a released orientation in response to the resistance pressure exceeds the second level of resistance during the extension of the lateral transfer means;

e) reset means to provide for the arm member to be returned to the deployed orientation from the released orientation prior to beginning a subsequent extension of the lateral transfer means.

11. The harvesting machine defined in claim 9 further comprising a forward guide, the forward guide positioned relative to the arm housing frame, the forward guide providing for a slidable engagement of each of the arm members to provide support thereto during the extension and retraction of the lateral transfer means.

12. The harvesting machine defined in claim 11 wherein the forward guide further comprises an arm member guide for the slidable engagement of each of the arm members and wherein the arm member guide has an open side thereon for passage therethrough of picking members attached to the arm member.

13. The harvesting machine defined in claim 9 wherein the rearward movement of the longitudinal transfer means has a rearward speed and wherein the forward movement of the longitudinal transfer means has a forward speed and wherein the forward speed is significantly greater than the rearward speed.

14. The harvesting machine defined in claim 9 wherein the positioning of the arm members relative to the arm housing further provides for the arm members to be extend generally perpendicular to the center axis of the machine frame.

15. A method of mechanically harvesting a fruit from a row of trees, the method comprising the steps of:

a) providing a harvesting machine having:
1) a machine frame having a center axis;
2) means to move the machine frame;
3) an arm housing frame mounted relative to the machine frame;
4) means to move the arm housing frame forward and rearward relative to the center axis of the machine frame;
5) an arm housing mounted relative to the arm housing frame;
6) means to move the arm housing outward and inward relative to the arm housing frame and generally perpendicular to the center axis of the machine frame;
7) a plurality of arm members positioned within the arm housing to extend outward generally perpendicular to the center axis of the machine frame;
8) a fruit picking member attached relative to each arm member to provide for an engagement of the fruit to sever the fruit from a respective tree;

b) moving the machine frame adjacent the row of trees;

c) then repetitively providing the following actions:
1) moving the arm housing frame rearward relative to the machine frame utilizing the means to move the arm housing frame forward and rearward relative to the center axis of the machine frame;
2) moving the arm housing outward relative to the arm housing frame during a first portion of the rearward movement of the arm housing frame relative to the machine frame utilizing the means to move the arm housing outward and inward relative to the arm housing frame and generally perpendicular to the center axis of the machine frame;
3) moving the arm housing inward relative to the arm housing frame during a second portion of the rearward movement of the arm housing frame relative to the machine frame utilizing the means to move the arm housing outward and inward relative to the arm housing frame and generally perpendicular to the center axis of the machine frame;
4) moving the arm housing frame forward relative to the machine frame utilizing the means to move the arm housing frame forward and rearward relative to the center axis of the machine frame.

16. The method defined in claim 15 wherein the fruit picking member of the provided harvesting machine further comprises a one piece construction from a flexible resilient material.

17. The method defined in claim 15 wherein a plurality of the fruit picking members are attached to each of the arm members of the provided harvesting machine.

18. The method defined in claim 17 wherein the plurality of fruit picking members attached to each of the arm members of the provided harvesting machine extended respectively from a first lateral side of the arm member and a second lateral side of the arm member.

* * * * *